F. D. TELLIN.
ROTARY HAY DISTRIBUTER.
APPLICATION FILED FEB. 21, 1920.
1,367,572.
Patented Feb. 8, 1921.
3 SHEETS—SHEET 3.
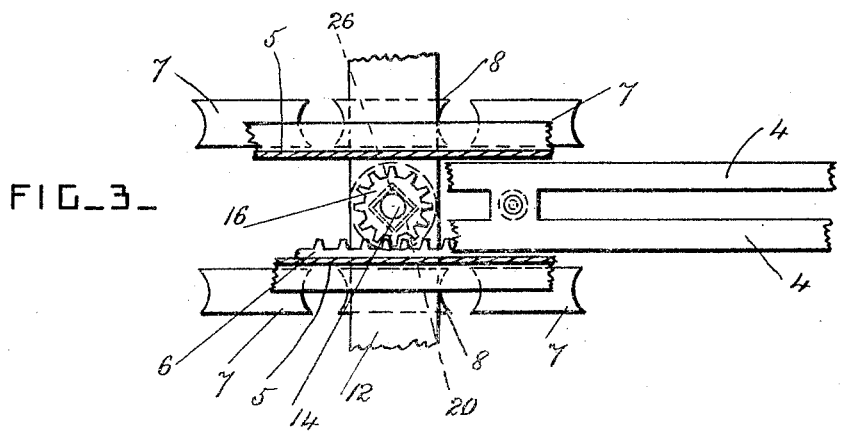
FIG_3_
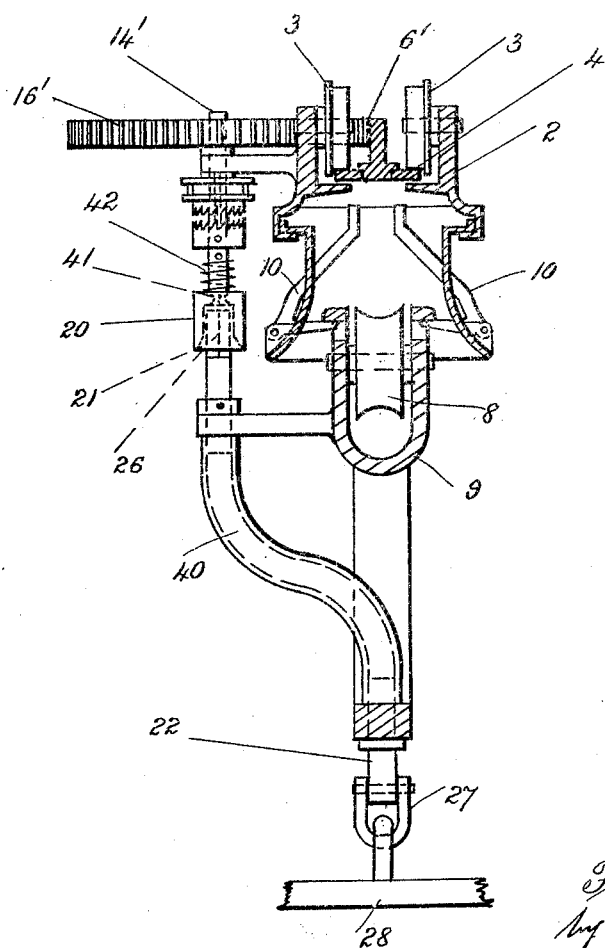
FIG_4_
Inventor.
Frank D. Tellin
by Herbert W. Jenner
Attorney.

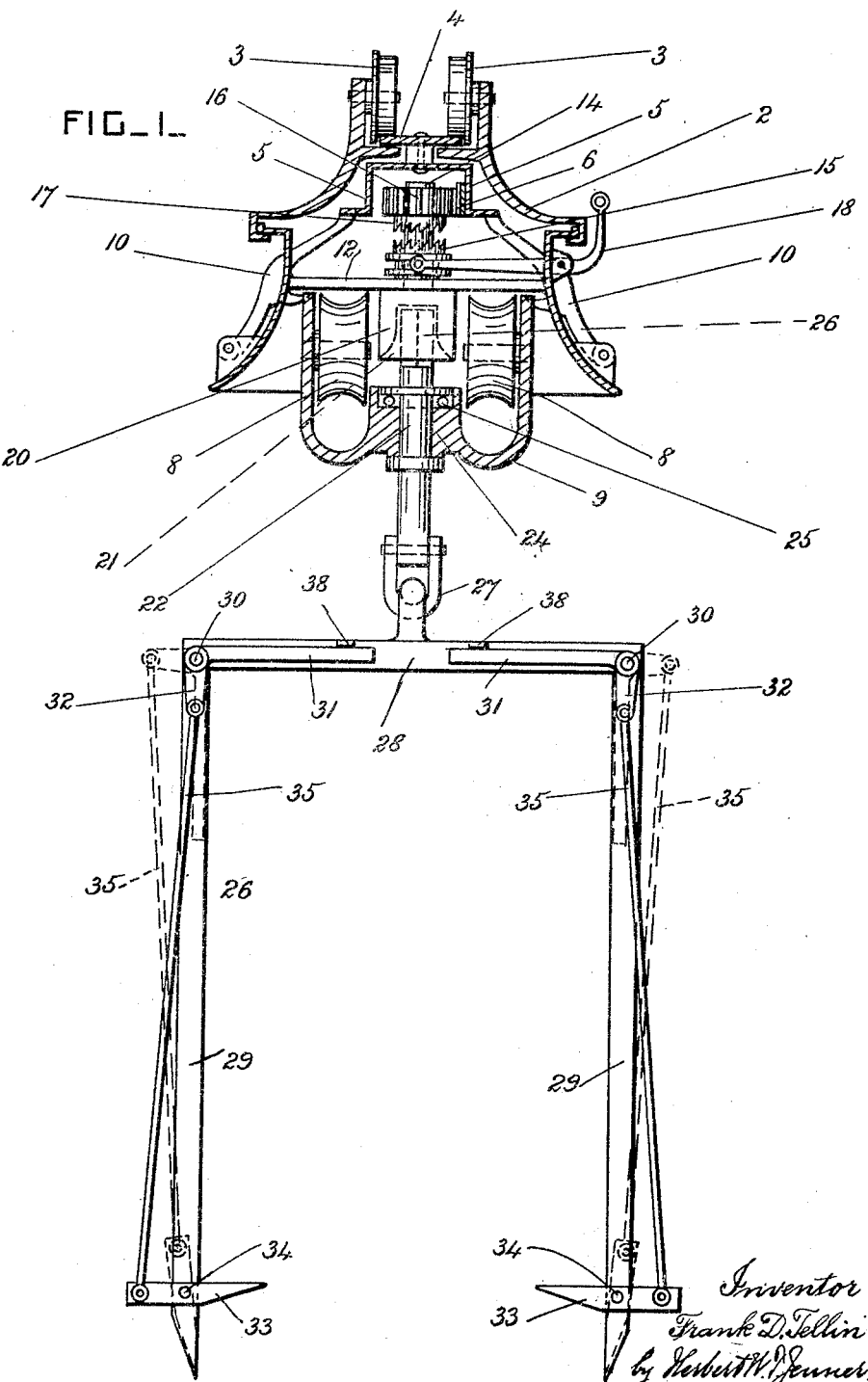

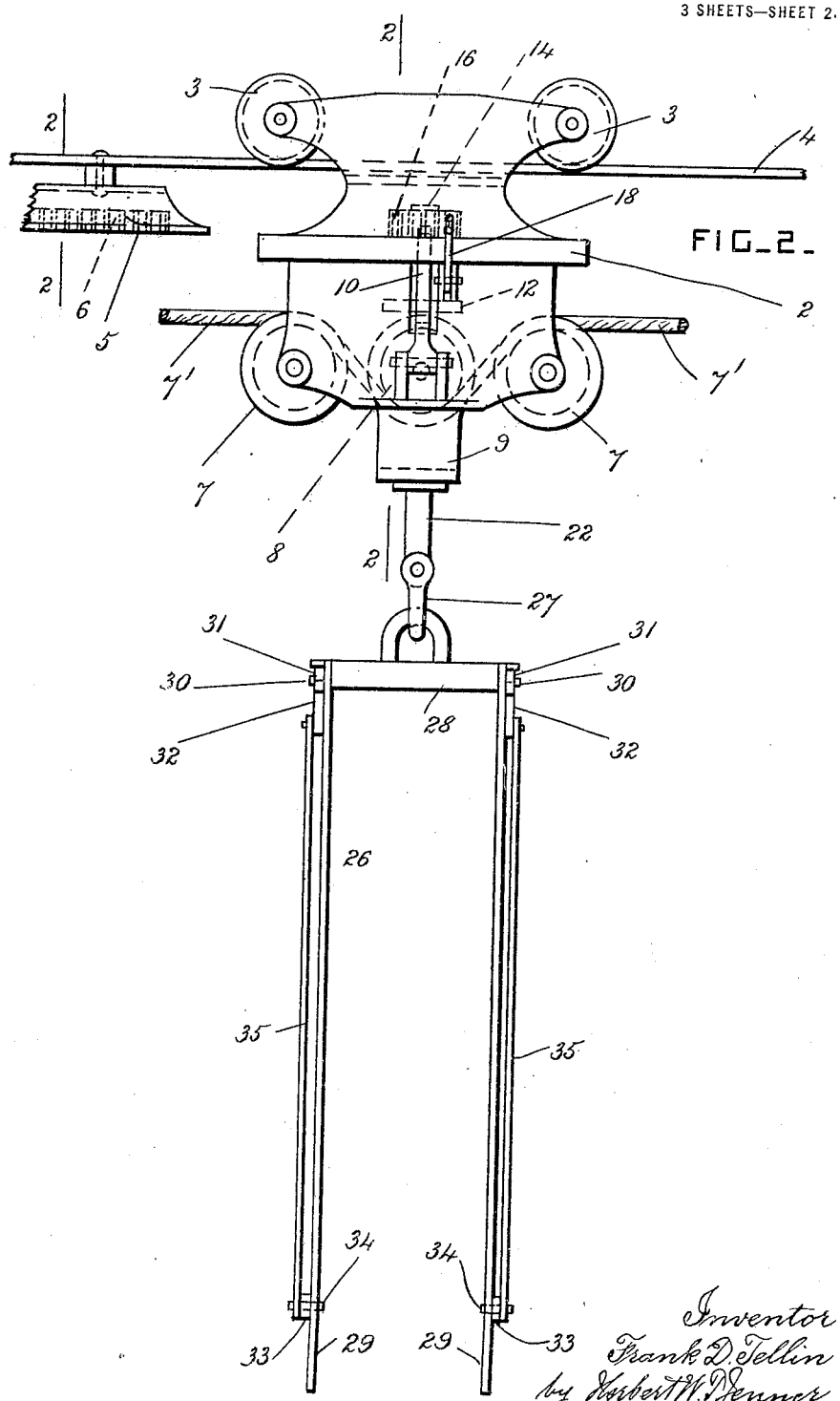

UNITED STATES PATENT OFFICE.

FRANK D. TELLIN, OF KALONA, IOWA.

ROTARY HAY-DISTRIBUTER.

1,367,572.　　　　Specification of Letters Patent.　　Patented Feb. 8, 1921.

Application filed February 21, 1920. Serial No. 360,318.

*To all whom it may concern:*

Be it known that I, FRANK D. TELLIN, a citizen of the United States, residing at Kalona, in the county of Washington and State of Iowa, have invented certain new and useful Improvements in Rotary Hay-Distributers, of which the following is a specification.

This invention relates to carriers for unloading hay and other similar material from wagons and depositing it in barns; and it consists in the novel construction and combination of the parts hereinafter fully described and claimed whereby the material is revolved rapidly when it arrives in the barn and is automatically discharged from the fork which carries it, and is distributed upon the floor of the barn.

In the drawings, Figure 1 is an end view, partially in section, taken on lines 2—2 in Fig. 2, of a rotary hay distributer constructed according to this invention. Fig. 2 is a side view of the same. Fig. 3 is a plan view of portions of the track and the trips, showing the toothed rack and other parts for revolving the hay fork and thereby discharging and distributing the hay. Fig. 4 shows a modification.

The carrier is provided with a supporting frame 2 having wheels 3 journaled in its end portions and running on tracks 4 which extend within the barn and over the hay wagon or other vehicle to be unloaded. These tracks are supported in any approved manner, and they have trips 5 secured to them inside the barn, the general construction and operation of the carrier being of any approved kind, such as shown in the patent to P. A. Myers, No. 727,823, dated May 12, 1903.

A toothed rack 6 is secured inside the barn parallel to the tracks and adjacent to the trips 5, and its use will be more fully explained hereinafter. The frame 2 has sheaves 7 for the lifting and operating ropes 7' journaled in it, but instead of a single pair of sheaves at the middle part of its width, as ordinarily provided, two pairs of sheaves 7 are provided and are arranged parallel to each other with a longitudinal space between them. Two similar operating ropes are provided, and two similar hoisting sheaves 8 are journaled in the center frame 9, and are arranged in line with the sheaves 7.

The main frame 2 has catches 10 pivoted to it, for supporting the center frame 9 when raised, and these catches are operated by the trips 5 to release the load when inside the barn, in the usual manner. The main frame 2 has a crossbar 12 at about the middle of its length, and a vertical shaft 14 is journaled at the middle part of this crossbar, and has a toothed clutch member 15 splined to it. A toothed pinion 16 is journaled loosely on the upper end portion of the shaft 14, and has a toothed clutch member 17 secured to it. The toothed pinion is arranged to run in gear with the toothed rack 6, and to be revolved by it as the frame is drawn along the track. A lever 18 is pivoted to the frame, and is operatively connected with the slidable clutch member 15, so that the rack and pinion can be caused to revolve the shaft 14 at will. A rectangular driving socket 20 is secured on the lower part of the shaft 14, and has a flaring entrance 21.

The center frame 9 has a vertical shaft 22 journaled in a bearing 24 between its hoisting sheaves 8, and arranged under the shaft 14. The shaft 22 is preferably supported by a ball bearing 25, and it has a rectangular driving portion 26 at its upper end for engaging with the driving socket 20, when the center frame is raised, as shown in Fig. 1. A fork 26 is pivotally connected to the lower part of the shaft 22 by a shackle 27, and it has a horizontal frame 28 at its upper part. Tines 29 are pivoted by pins 30 to the ends of the frame 28, and normally project downwardly, and have pointed ends. Bell-crank levers 31 are also pivoted to the pins 30, and have short arms 32 which project outwardly. Teeth 33 are pivoted by pins 34 to the lower end portions of the tines, and 35 are connecting-rods pivoted to the teeth and to the short arms 32 of the bell-crank levers. When the long arms of the bell-crank levers are turned downwardly, as shown in dotted lines in Fig. 1, the teeth 33 are placed in line with the tines.

The tines are thrust into the hay on the hay wagon when the teeth are in this position, by lowering the center frame and fork, and the long arms of the bell-crank levers are then raised against the stops 38 on the frame 28, to place the teeth crosswise of the tines, as shown in full lines in Fig. 1, so as to retain the hay on the tines. The fork with its load of hay is raised in the usual way until the parts assume the positions shown in Fig. 1, and the two vertical shafts are in driving engagement.

The frame 2 and the parts connected to it are then run along the track, and the toothed pinion 16 is placed in driving connection with the upper vertical shaft 14 by means of the clutch. When the toothed pinion engages with the toothed rack inside the barn, the fork with its load of hay is revolved rapidly. The tines are flung outwardly on their pivots by centrifugal force, and the hay is released from the retaining teeth by the connecting-rods which are pivoted to the short arms of the bell-crank levers below the pivot pins of the tines. This action of the tines distributes the hay over the floor of the barn, and the hay can be discharged at various points by suitably operating the clutch lever which controls the driving connection of the toothed pinion with the upper vertical shaft.

In the modification shown in Fig. 4, the vertical driving shaft 14' is arranged to one side of the main frame, instead of vertically over the shaft 22, and the two shafts are operatively connected by a flexible shaft 40, or any other approved intermediate driving mechanism such as shafts provided with universal joints or couplings. The shaft 14' has a flexible coupling 41 normally held in position by a spring 42, and is driven by a toothed wheel 16' which gears into a toothed rack 6' on the track.

What I claim is:

1. In a rotary hay distributer, a track, a toothed rack secured parallel to the track, a frame which runs on the track, an upper vertical shaft journaled in the said frame, a center frame, a lower vertical shaft journaled in the center frame, means for revolving the lower shaft from the upper shaft when the center frame is raised, rope sheaves journaled in the said frames, means for engaging the load carried by the lower vertical shaft, and a toothed pinion which gears into the said rack and is operatively connected with the upper shaft, said pinion being revolved by the toothed rack when moved along in gear with it by the frame.

2. In a rotary hay distributer, a track, a toothed rack secured parallel to the track, a frame which runs on the track, an upper vertical shaft journaled in the said frame, a clutch member splined on the said shaft and provided with means for sliding it longitudinally, a toothed pinion journaled loosely on the said shaft and provided with a clutch member for the aforesaid clutch member to engage with, a center frame, a lower vertical shaft journaled in the center frame and engaging with the upper shaft when the center frame is raised, rope sheaves journaled in the said frames, and means for engaging the load carried by the lower vertical shaft and adapted to be revolved by the said rack and pinion.

3. In a rotary hay distributer, a track, a frame which runs on the track, an upper vertical shaft journaled in the said frame and having a driving socket at its lower part provided with a flaring entrance, a center frame, a lower vertical shaft journaled in the center frame and having a driving member at its upper end which engages positively with the said driving socket when the center frame is raised, rope sheaves journaled in the said frames, means for engaging the load carried by the lower vertical shaft, and driving devices for revolving the upper shaft.

4. In a rotary hay distributer, a track, a hay carrier device which runs on the said track and is provided with a vertical shaft, a hay fork suspended from the said shaft and provided with pivoted tines which are moved outwardly to release the hay when the said shaft is revolved, and means for revolving the said shaft at will.

5. In a rotary hay distributer, a track, a hay carrier device which runs on the said track and is provided with a vertical shaft, a hay fork suspended from the said shaft and provided with pivoted tines which are moved outwardly to release the hay when the said shaft is revolved, a toothed pinion operatively connected with the said shaft, and a toothed rack secured parallel to the track and operating to revolve the said pinion and shaft as the hay carrier device is moved along the track.

6. In a rotary hay distributer, a track, a hay carrier device which runs on the said track and is provided with a vertical shaft, a hay fork suspended from the said shaft and provided with pivoted tines which are moved outwardly to release the hay when the said shaft is revolved, a toothed pinion operatively connected with the said shaft, a toothed rack secured parallel to the track and operating to revolve the said pinion and shaft as the hay carrier device is moved along the track, bell-crank levers pivoted concentric with the said tines, retaining teeth pivoted to the tines, and connecting-rods between the said teeth and bell-crank levers, said teeth being placed in line with the tines by the bell-crank levers when the tines are moved outwardly to release the hay.

In testimony whereof I have affixed my signature.

FRANK D. TELLIN.